United States Patent [19]

Dar

[11] Patent Number: 4,809,006
[45] Date of Patent: Feb. 28, 1989

[54] SATELLITE COMMUNICATIONS USING THE TELEMETRY TRACKING AND CONTROL SYSTEM

[75] Inventor: Tariq B. Dar, Morrisville, Pa.

[73] Assignee: General Electric Company, East Windsor, N.J.

[21] Appl. No.: 868,958

[22] Filed: May 30, 1986

[51] Int. Cl.$^4$ .......................................... H04B 7/185
[52] U.S. Cl. ...................................... 342/352; 342/353
[58] Field of Search ...................... 342/352, 353, 356; 455/12, 13

[56] References Cited

U.S. PATENT DOCUMENTS

| | | |
|---|---|---|
| Re. 28,725 | 2/1976 | Hutchinson et al. |
| 3,710,255 | 1/1973 | Gicca ................................ 455/13 |
| 3,860,870 | 1/1975 | Furuya . |
| 4,002,980 | 1/1977 | Herz ................................ 342/352 |
| 4,012,696 | 3/1977 | Fletcher et al. ................ 342/353 |
| 4,130,801 | 12/1978 | Prygoff . |
| 4,181,886 | 1/1980 | Cooperman ..................... 342/352 |
| 4,425,642 | 1/1984 | Moses et al. .................... 375/1 X |
| 4,567,485 | 1/1986 | Oshima et al. ................. 342/352 |

Primary Examiner—Nelson Moskowitz
Assistant Examiner—John B. Sotomayor
Attorney, Agent, or Firm—Clement A. Berard, Jr.

[57] ABSTRACT

An audio satellite communication system is provided using the ranging mode of a telemetry tracking and control (TT&C) system. The audio is placed on one of the ranging tone subcarriers of a TT&C ground station and received via the ranging tone subcarrier at other TT&C ground stations within the coverage area of the satellite omni-directional antenna.

7 Claims, 1 Drawing Sheet

SATELLITE COMMUNICATIONS USING THE TELEMETRY TRACKING AND CONTROL SYSTEM

The government has rights in this invention pursuant to Contract No. F04701-84-C-0110 awarded by the Department of the Air Force.

This invention relates to communications via the satellite Telemetry Tracking and Control (TT&C) system and, more particularly, to utilizing the TT&C system in the ranging mode.

Satellite communications has found wide use throughout the world. In conventional satellite communications, RF signals at one or more channel frequencies are transmitted to the satellite from one or more earth stations. These signals are received at the satellite via the communications antenna, converted to down-link frequencies and amplified by transponders and transmitted back to earth where they are picked up at one or more earth stations.

It may be desirable in some emergency conditions, such as when all the transponders are in use and the ground station personnel wish to communicate with one another, or, in the case of a secure communications environment, that some means be provided to communicate without using the normal communications transponders. It is also desirable to provide this feature without large additional costs. The present application does not utilize the typical communications network including the transponders.

There are special ground stations, generally called the Telemetry Tracking and Control (TT&C) stations, which provide monitor and control functions for the orbiting satellites. These stations receive telemetry data from the satellite in order to monitor the operational condition of the satellite. Commands for satellite control and ranging signals for satellite tracking are transmitted to the satellite from these stations. The ranging tones are, by way of example, signals somewhere in the 5 Hz to 75 KHz frequency range and are modulated on a carrier and/or a subcarrier.

SUMMARY OF THE INVENTION

One embodiment of a satellite communications system in accordance with the present invention comprises a satellite and at least two TT&C ground stations. The TT&C ground stations and the satellite include means for providing and receiving ranging signals for determining the range of the satellite. An audio pick-up means, such as a microphone, provides an audio communications signal and a means for modulating this signal on a ranging tone subcarrier signal is also provided. This subcarrier is transmitted to the satellite on the command up-link carrier. The up-link signal at the satellite command receiver is retransmitted back to the ground via the down-link frequencies and is down converted and detected and the audio signal, rather than being applied to a phase detector for determining the range, is applied to a speaker.

In the drawing:

FIG. 1 is a diagram illustrating two telemetry tracking and control (TT&C) ground stations and a satellite; and FIG. 2 is a block diagram of the system according to one embodiment of the present invention.

DESCRIPTION OF THE PREFERRED EMBODIMENT

Figure 1:
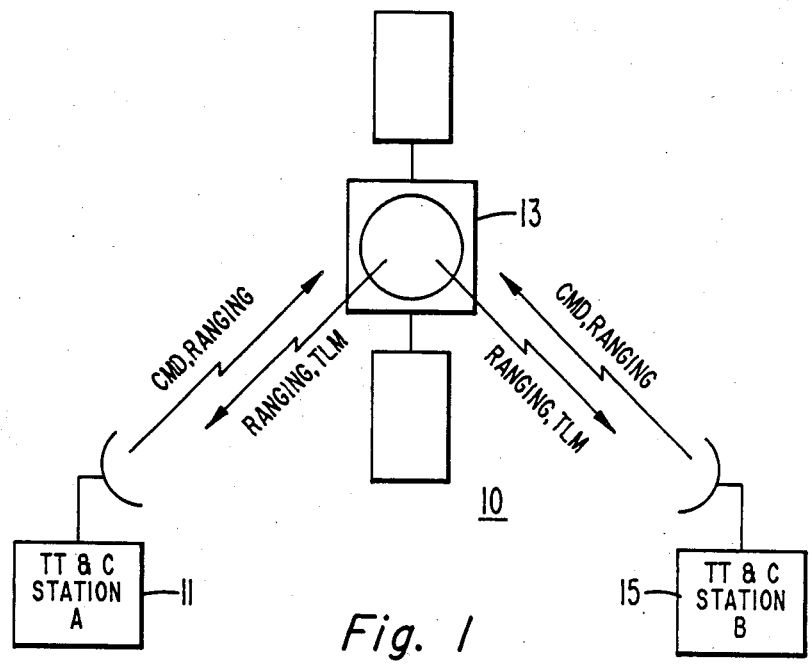

Referring to FIG. 1 there is illustrated a system 10 according to the present invention which comprises one Telemetry Tracking and Control (TT&C) station 11 transmitting command and ranging signals to satellite 13. There is also illustrated a second Telemetry Tracking and Control (TT&C) station 15 which similarly may send command and ranging signals, and receive ranging and telemetry signals from the satellite. The command signals contain command information to the satellite to operate such things as thrusters, attitude control processors, etc. The ranging signal is a tone which, when corrected for the delay in the satellite and returned back to the TT&C station, enables the TT&C station to determine the orbit range information for determining the position of the satellite in orbit and therefore the satellite's orbit.

In accordance with the present invention, communications between stations 11 and 15 are accomplished using the ranging mode. The ranging mode is used infrequently and therefore, makes this communication link available at all times except during ranging operations. Further, only the Telemetry Tracking and Control (TT&C) stations are equipped for detecting range tones and therefore, this provides a degree of security for such communications. The satellite TT&C subsystem can also use an omni antenna and therefore the system can be operable when the satellite's attitude is in error. Also, this communication link can be established using any type of satellite that incorporates the tone ranging system.

Figure 2:
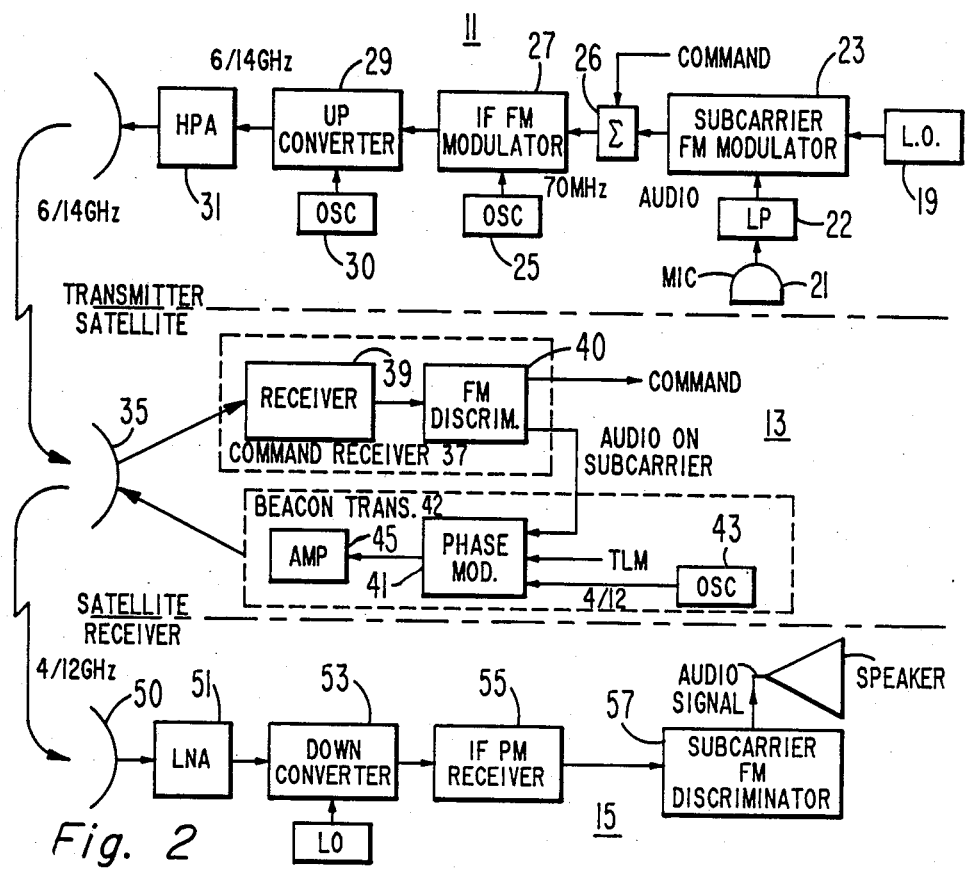

Referring to FIG. 2, the audio signal from a microphone 21 is supplied to a 19 KHz subcarrier FM modulator 23. The audio signal is bandwidth limited to 3 KHz by low pass filter 22 and is used to frequency modulate a subcarrier with frequency deviation less than 3 KHz. The subcarrier frequency must be within the baseband bandwidth of the satellite's command receiver/beacon transmitter combination. In the instant case, the subcarrier frequency selected is 19 KHz supplied from oscillator source 19.

The modulated 19 KHz subcarrier and the command tone are summed at summer 26 and they FM modulate a 70 MHz intermediate frequency (IF) carrier signal from oscillator 25 at IF FM modulator 27. The output from modulator 27 is then applied to an up-converter 29, which for C-band communications converts the signal to the up-link carrier frequency of 6.4 GHz from oscillator 30. For Ku-band the up-link carrier frequency is 14 KHz. The up-link carrier signal from converter 29 is amplified via high-power amplifier 31 and transmitted via the Telemetry Tracking and Control station antenna 33.

The up-link carrier signal is received via the satellite communications or omni-directional antenna 35 and is applied to the command receiver 37. At the satellite command receiver 37 the ranging signals are separated from the command signals. The ranging and command signals are amplified and down-converted to an IF frequency and demodulated at FM discriminator 40 to provide separately the command signals and the audio signal on the 19 KHz subcarrier. The 19 KHz subcarrier phase modulates the down-link carrier at modulator 41 of the beacon transmitter 42, along with the telemetry signals (TLM) from the satellite. The down-link carrier frequency is provided by source 43 and is 3.7 or 4.2

GHz for C-band, and 11.7 and 12.2 GHz for Ku-band satellites. The 19 KHz subcarrier modulates the down-link carrier from oscillator 43 with a peak phase deviation of 1.0±0.15 radians. The phase modulated down-link carrier is amplified by amplifier 45 of beacon transmitter 42 and radiated via satellite antenna 35.

In conventional ranging, the transmitted ranging signal from the beacon transmitter and amplifier is sent via antenna 35 back to the same station 11 where ranging calculations take place. Satellite systems usually have more than one TT&C ground station. In accordance with the present invention a second TT&C ground station in the same coverage area of the antenna and conventionally used for also controlling the satellite is used as the remote receiver ground station.

At the receiving ground stations, such as ground station 15 in FIG. 1, the Telemetry Tracking and Control station antenna 50 picks-up the signals radiated from the satellite antenna 35 and amplifies this via low noise amplifier 51 and applies this signal to a down-converter 53 which down-converts this signal to an IF carrier at 70 MHz wherein a 70 MHz PM receiver 55 detects the phase modulated signals and produces the 19 KHz subcarrier. The 19 KHz subcarrier is applied to the subcarrier FM discriminator 57 and the output from this discriminator 57 is coupled to a speaker 60 to thus reproduce the original audio sound.

I claim:

1. In a command, ranging, and telemetry arrangement including:
    a pair of command, ranging, and telemetry ground stations, each including: a ranging tone generator, means for modulating said ranging tone on a ranging tone subcarrier, means for combining said modulated ranging tone subcarrier with a command signal, means for transmitting said combined modulated ranging tone subcarrier and said command signal on an up-link carrier, means for receiving a down-link carrier, and means for recovering from said down-link carrier said modulated ranging tone subcarrier and for detecting said ranging tone; and
    a satellite including means for receiving said up-link carrier and for recovering said modulated ranging tone subcarrier and said command signal therefrom, and further including a source of said down-link carrier and means for transmitting said recovered modulated ranging tone subcarrier on said down-link carrier;
    whereby said satellite receives said modulated ranging tone subcarrier and retransmits it at the down-link frequency, and said retransmitted ranging tone subcarrier is received by the ground station from which it was transmitted and by the other ground station;
    an improvement for providing audio communications between said command, ranging, and telemetry ground stations comprising:
    at least a first of said ground stations further including means for providing a band limited audio signal, and means for modulating said band limited audio signal on said ranging tone subcarrier in place of said ranging tone; and
    at least said other of said command, ranging, and telemetry ground stations further including means for detecting said audio signals from said modulated ranging tone subcarrier and means coupled to said detecting means for applying said audio signal to a utilization device.

2. The improvement of claim 1 wherein said modulated ranging tone subcarrier is frequency modulated on said up-link carrier and is phase modulated on said down-link carrier.

3. The combination of claim 1, wherein said utilization device is a speaker and said audio signal providing means is a microphone.

4. The combination of claim 1 wherein said means for transmitting on said down-link carrier includes an omnidirectional antenna.

5. The method of claim 2 including the step of applying said detected audio signal to a speaker.

6. In a method providing command, ranging, and telemetry functions for a satellite including the steps of:
    in each of at least a pair of command, ranging, and telemetry ground stations: generating a ranging tone, modulating said ranging tone on a ranging tone subcarrier, combining said modulated ranging tone subcarrier with a command signal, transmitting said combined modulated ranging tone subcarrier and said command signal on an up-link carrier, receiving a down-link carrier, recovering from said down-link carrier modulated ranging tone subcarrier and detecting said ranging tone; and
    in a satellite, receiving said up-link carrier and recovering said modulated ranging tone subcarrier and said command signal therefrom, providing said down-link carrier, and transmitting said recovered modulated ranging tone subcarrier on said down-link carrier;
    whereby said satellite receives said modulated ranging tone subcarrier and retransmits it at the down-link frequency, and said retransmitted ranging tone subcarrier is received by the ground station from which it was transmitted and by the other ground station;
    an improved method for providing audio communications between said command, ranging, and telemetry ground stations comprising the steps of:
    in at least a first of said ground stations, providing a band limited audio signal, and modulating said band limited audio signal on said ranging tone subcarrier in place of said ranging tone; and
    in at least said other of said command, ranging, and telemetry ground stations, detecting said audio signals from said modulated ranging tone subcarrier and applying said audio signal to a utilization device.

7. The method of claim 6 wherein said step of modulating said ranging tone subcarrier on said up-link carrier includes frequency modulating and said step transmitting said recovered modulating ranging tone subcarrier includes phase modulation.

* * * * *